(12) United States Patent
Schzukin et al.

(10) Patent No.: US 6,591,317 B1
(45) Date of Patent: Jul. 8, 2003

(54) QUEUE INCORPORATING A DUPLICATE COUNTER PER ENTRY

(75) Inventors: Golan Schzukin, Tel Aviv (IL); Ilan Shimony, Haifa (IL); Zvika Bronstein, Ramat Efal (IL)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/569,950

(22) Filed: May 12, 2000

(51) Int. Cl.[7] .............................................. G06F 13/00
(52) U.S. Cl. ........................ 710/52; 710/4; 710/33; 710/54; 710/55; 710/56
(58) Field of Search ................. 710/4, 33, 52, 710/54, 55, 56

(56) References Cited

U.S. PATENT DOCUMENTS

| | | | |
|---|---|---|---|
| 5,525,982 A | * 6/1996 | Cheng et al. | 341/51 |
| 6,026,505 A | * 2/2000 | Hedberg et al. | 714/711 |
| 6,170,034 B1 | * 1/2001 | Weston-Lewis et al. | 711/4 |
| 6,252,877 B1 | * 6/2001 | Kozaki et al. | 370/399 |

OTHER PUBLICATIONS

ATM Practical Implementations Here and Now, 3COM Corporation, 1996.

* cited by examiner

Primary Examiner—Jeffrey Gaffin
Assistant Examiner—Mohammad O. Farooq
(74) Attorney, Agent, or Firm—Howard Zaretsky; Paul J. Sutton

(57) ABSTRACT

A queue having a 'duplicate' counter associated with each entry whereby duplicate data is not stored in the queue. Before data is placed in the queue, the queue is searched for an entry matching the data to be written. If a match is found, the duplicate counter associated with the entry is incremented. Further, if a match is found and the data stored therein is inconsistent with the current data, the contents of the queue are updated and the duplicate counter associated with the entry is reset to one. If a match is not found, the data is written to the queue and the duplicate counter associated with the entry is initialized to one.

18 Claims, 3 Drawing Sheets

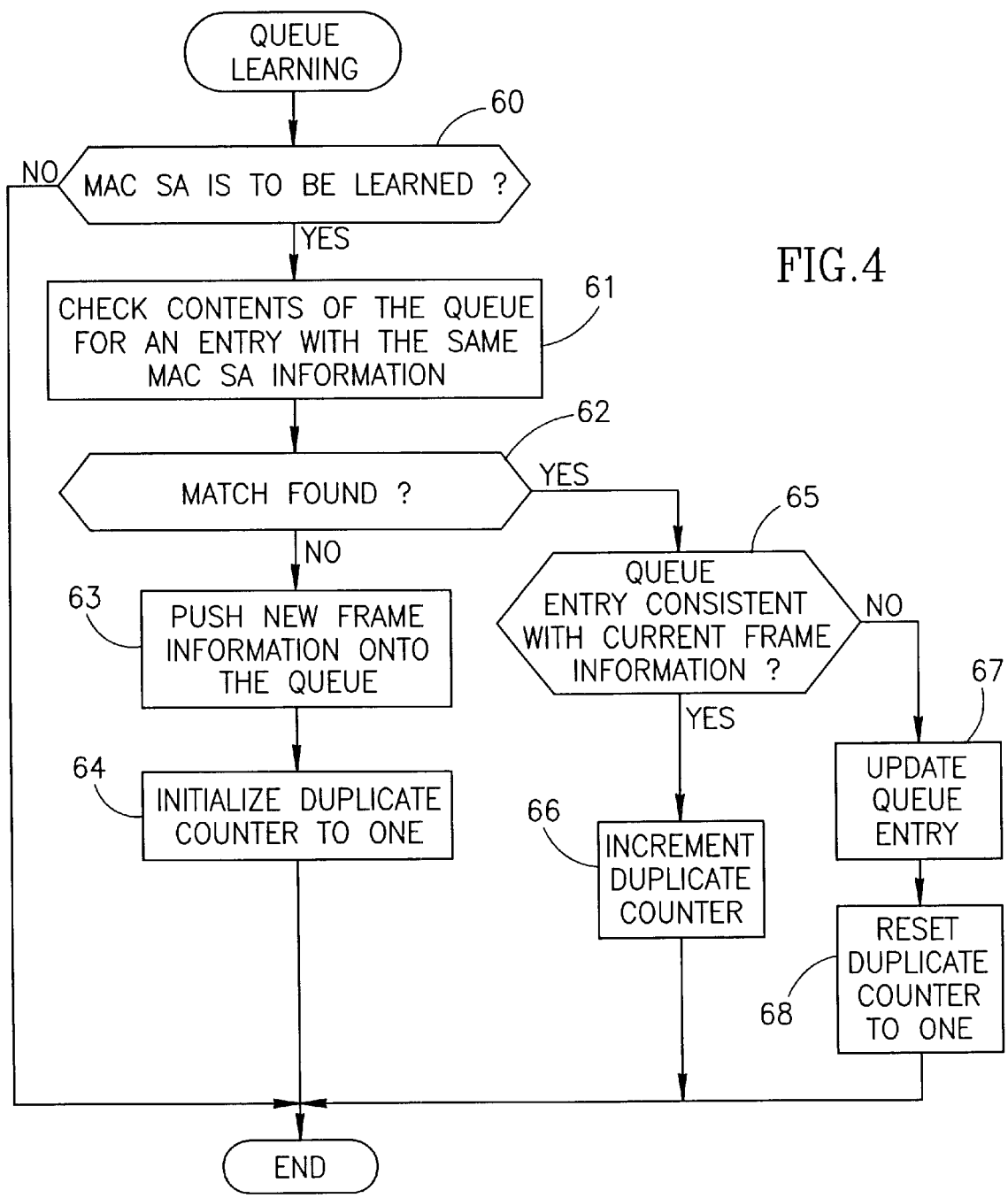

QUEUE INCORPORATING A DUPLICATE COUNTER PER ENTRY

FIELD OF THE INVENTION

The present invention relates generally to data communications networks and more particularly relates to a queue incorporating a duplicate counter per entry.

BACKGROUND OF THE INVENTION

Currently, the number of data networks and the volume of traffic carried by these networks is expanding at an ever increasing rate. The network devices used to construct these networks generally consist of specialized hardware designed to move data at very high speeds. Typical networks, such as Ethernet based networks, are mainly comprised of end stations, Ethernet hubs, switches, routers, bridges and gateways. ATM networks are constructed with similar network devices adapted to carry ATM traffic, e.g., ATM capable end stations, edge devices and ATM switches.

With the ever increasing user demand for faster and faster data communications, network devices have had to perform at higher and higher speeds. A primary function of many network devices is to receive frames (packets, cells, etc.) at one or more ingress ports, and forward the frame to an appropriate egress port. Accomplishing this requires that the network device make a forwarding decision about the received frame. This requires processing resources and memory resources to store the frame until the forwarding decision is complete and the packet is placed onto the appropriate one or more output ports.

In particular, when a frame (note that the same applies to cells and packets as well), arrives at a switch, for example, typically only its header is examined and a forwarding decision is made therefrom. The application of the decision to the frame requires that the entire frame be queued to an output port. In some implementations, the frame is not scheduled for transmission until the complete frame is successively received.

In prior art store and forward schemes, the frame is not queued into the output port until the entire frame is received. The forwarding decision is made in an input server after receipt of the header portion. The frame, however, is not queued to an output port until the entire frame is received. Thus, the frame header and the forwarding result must be stored until the complete frame is received.

In such devices, it is common to place entries in a queue whose entries are processed asynchronously at a later time. The entries may comprise the entire received frame or may comprise portions of a frame such as the frame header. For example, a network device may have a learning queue for storing information from received frames such as the header or the MAC source address that is unknown so that the software will read it at a later time and update the internal forwarding tables. In operation, a frame enters the device and the source address is used as a lookup index to the forwarding table. An entry is placed in the learn queue when the MAC source address extracted from the frame does not appear in the hardware tables or does appear but with the wrong information. A software process asynchronously processes the entries placed in the queue whereby the MAC source address is thus learned.

Consider the case wherein a frame is received that does not have an associated forwarding decision. In prior art systems, once it is determined that a MAC source address is to be learned, it is pushed into the learning queue even if the same entry is already present in the queue but has not yet been processed. If, however, many frames with the same source address are received before the software processes the learning queue, then the frame will be entered over and over again into the learning queue. Additional frames received before the first entry is processed are written into the queue. This effects the utilization of the queue, lowering it considerably. It also causes processing time to be spent unnecessarily on all the similar entries in the queue.

Moreover, in the event a station sends a burst of traffic incorporating many frames having the same MAC source address, the MAC source address may be pushed numerous times onto the learning queue before the software has an opportunity to process it.

SUMMARY OF THE INVENTION

The present invention solves the problems associated with the prior art by providing a queue having a 'duplicate' counter associated with each entry. Data to be written to the queue is not automatically stored. Rather, before data is placed in the queue, the queue is searched for an entry matching the data to be written. If a match is found, the duplicate counter associated with the entry is incremented. Further, if a match is found and the data stored therein is inconsistent with the current data, the contents of the queue are updated and the duplicate counter associated with the entry is reset to one.

If a match is not found, the data is written to the queue and the duplicate counter associated with the entry is initialized to one. In accordance with the present invention, duplicate entries are not entered into the queue in the event an identical entry already exists. In this manner, the utilization of the queue is greatly increased and the queue size required is reduced significantly.

Optionally, the duplicate entry counter may be read periodically and alternative processing performed on the entry in the event the duplicate counter value exceeds a predetermined threshold. In addition, the value of the duplicate counter may optionally be used to determine priority among the entries in the queue.

It is appreciated that the present invention is particularly suitable in cases where the number of required entries is relatively small, i.e. 1 to 100 entries. This permits an easier implementation of the compare operation whereby a new entry to be entered into the queue is compared with all the existing entries in the queue. Note, however, that queues with a larger number of entries may be constructed in accordance with the present invention using standard Content Addressable Memory (CAM) devices.

There is thus provided in accordance with the present invention a queue comprising a plurality of storage locations, each storage location adapted to store an entry, a plurality of duplicate counters, each duplicate counter associated with a different storage location and processing means operative to search, for each entry to be written to the queue, the plurality of storage locations for a matching entry previously written to the queue, and if a match is found, increment the duplicate counter associated with the matching entry, and if a match is not found, store the entry to be added in an unused storage location and initializing to one a duplicate counter associated with the entry to be added.

There is also provided in accordance with the present invention a learning queue for use by software means in a network device in learning the associations between Media Access Control (MAC) source addresses and corresponding ports in the device comprising a plurality of storage locations, each storage location adapted to store an entry including a MAC source address and corresponding port, a plurality of duplicate counters, each duplicate counter associated with a different storage location and a queue control circuit operative to search the plurality of storage locations for an entry having the same MAC source address as the MAC source address to be learned, and if a match is found, increment the duplicate counter associated with the matching entry, and if a match is not found, store the entry to be learned in an unused storage location and initializing to one a duplicate counter associated with the entry to be learned.

BRIEF DESCRIPTION OF THE DRAWINGS

The invention is herein described, by way of example only, with reference to the accompanying drawings, wherein:

FIG. 3 is a diagram illustrating the format of each entry of the queue of FIG. 1; and FIG. 4 is a flow diagram illustrating the method of handling duplicate entries in said queue using a duplicate counter associated with each entry in accordance with the present invention.

DETAILED DESCRIPTION OF THE INVENTION

Notation Used Throughout

The following notation is used throughout this document.

| Term | Definition |
| --- | --- |
| ATM | Asynchronous Transfer Mode |
| BUS | Broadcast and Unknown Server |
| CAM | Content Addressable Memory |
| DA | Destination Address |
| ELAN | Emulation LAN |
| FIFO | First In First Out |
| IP | Internet Protocol |
| LAN | Local Area Network |
| LE | LAN Emulation |
| LEC | LAN Emulation Client |
| LECS | LAN Emulation Configuration Server |
| LES | LAN Emulation Server |
| MAC | Media Access Control |
| MPOA | Multiprotocol Over ATM |
| OC | Optical Carrier |
| PDU | Protocol Data Unit |
| SA | Source Address |
| SMS | Selective Multicast Server |
| VCI | Virtual Circuit Identifier |
| VLAN | Virtual Local Area Network |
| VPI | Virtual Path Identifier |

Description of the Invention

The present invention solves the problems associated with the prior art by providing a queue that incorporates a duplicate counter for each entry. Before data is placed in the queue, the queue is searched for an entry matching the data to be written. If a match is found, the duplicate counter associated with the entry is incremented. The data is not entered into the queue since an identical entry already exists. In this manner, the utilization of the queue is much more efficient. Optionally, the duplicate entry counter may be utilized to determine one or more levels (analogous to an oil dipstick in a car) at which certain action is taken or certain processing is performed.

It is appreciated that the present invention is particularly useful in the case where the queue comprises a relatively small number of entries, i.e. 1 to 100 entries. This permits an easier implementation of the compare operation whereby a new entry to be entered into the queue is compared with all the existing entries in the queue.

For illustration purposes, the principles of the present invention are described in the context of an example network device comprising an ATM edge device having a plurality of Ethernet ports and one or more ATM ports. Thus, the example device is simultaneously connected to an Ethernet network and an ATM network. Note, however, it is not intended that the invention be limited to the network device described herein. It is appreciated that one skilled in the electrical or networking arts may apply the present invention to numerous other types of devices as well without departing from the spirit and scope of the invention. Note that throughout this document, references are made to Ethernet frames and ATM cells which are example protocol data units (PDUs) associated with Ethernet networks and ATM network, respectively. It is appreciated that the invention may be adapted for use in other types of networks that transmit other types of PDUs, e.g., packets.

Figure 1:
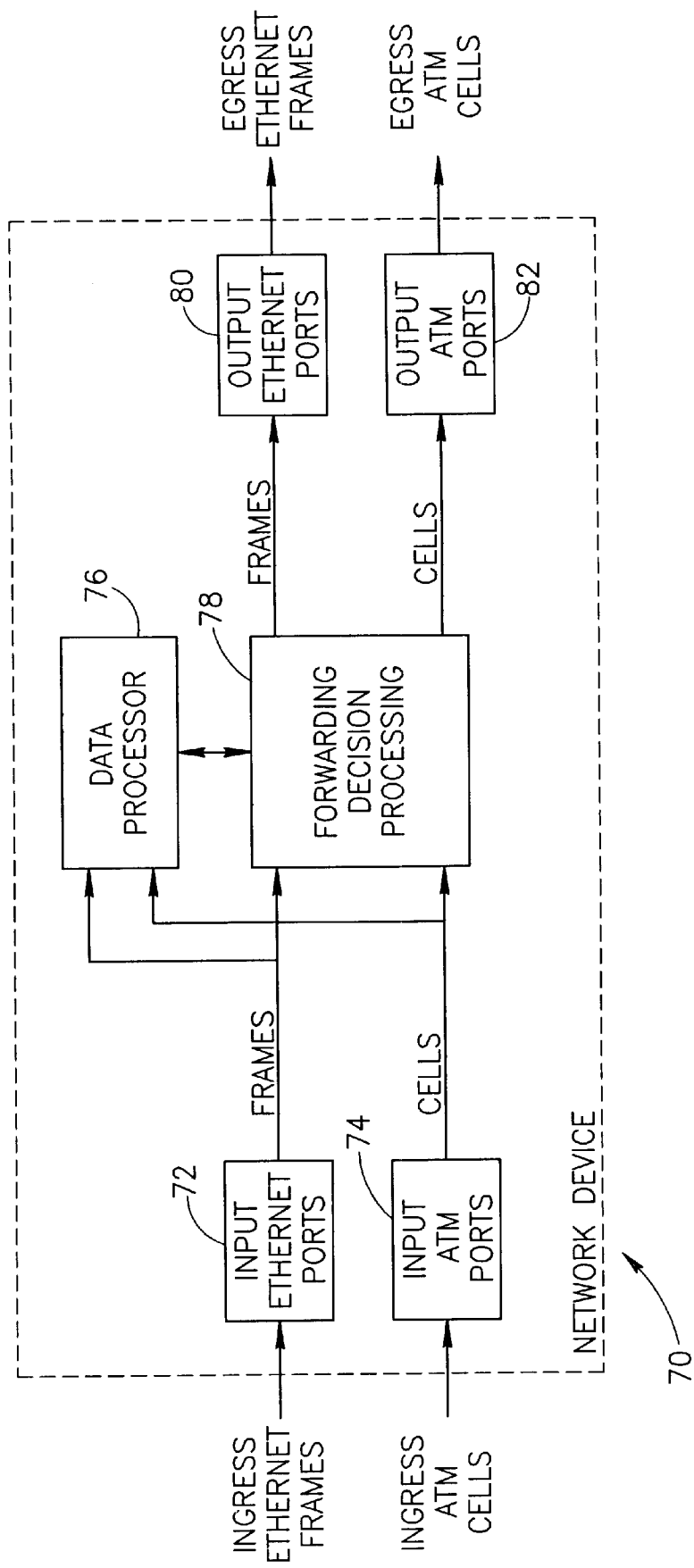
FIG. 1 is a block diagram illustrating an example network device incorporating one or more Ethernet and ATM ports.

A block diagram illustrating an example network device incorporating one or more Ethernet and ATM ports is shown in FIG. 1. The example network device, generally referenced 70, comprises an edge device for use in an ATM network. The device 70 comprises a plurality of Ethernet ports and ATM ports. In addition, the device provides standard LAN Emulation services, such as LEC, BUS, LECS, LES, SMS, etc., as defined by ATM Forum LAN Emulation standards. LAN Emulation permits Ethernet traffic to be transported across ATM circuits. For illustration purposes, the Ethernet and ATM ports in the network device have been separated into ingress and egress portions.

In particular, input Ethernet ports 72 are connected to an Ethernet network and adapted to receive ingress Ethernet frames. Similarly, input ATM ports 74 are connected to an ATM network and adapted to receive ingress ATM cells. Output Ethernet ports 80 are connected to the Ethernet network and adapted to output egress Ethernet frames. Similarly, output ATM ports 82 are connected to the ATM network and adapted to output egress ATM cells.

The Ethernet ports within the device may be adapted to transmit and receive 10 Mbps, 100 Mbps or 1000 Mbps Ethernet signals. The example device is also adapted to provide Layer 2 and Layer 3 switching among the Ethernet ports. Further, the device may support VLANs, multicast and MPOA protocols. A main function of the device is to forward data frames between the two types of networks, i.e. Ethernet and ATM, via the ports connected to each type of network. The Ethernet frame received may contain various parameters that are used in the forwarding process such as, for example, MAC Destination Address (DA), MAC Source Address (SA), IP DA, VLAN ID, LEC ID, ELAN ID, LE frames (received from ATM) and MPOA frames.

The device also comprises a data processor 76 and a forwarding decision processor 78. Forwarding decisions are made by the forwarding decision processor 78 that is configured dynamically by the data processor 76. Ingress Ethernet frames and ATM cells are input and processed by both the data processor 76 and the forwarding decision processor 78. In one alternative implementation of the network device, Ethernet frames on each of the Ethernet ports are segmented into ATM cells and forwarded to the appropriate destination on either the ATM or Ethernet network. If destined to an Ethernet port, the cells are assembled back into Ethernet frames before transmission through the output port.

The ATM ports, for example, may operate at 155 Mbps (OC-3) or 622 Mbps (OC-12). The Ethernet ports may operate at 10 Mbps Mbps Gigabit Ethernet.

Figure 2:
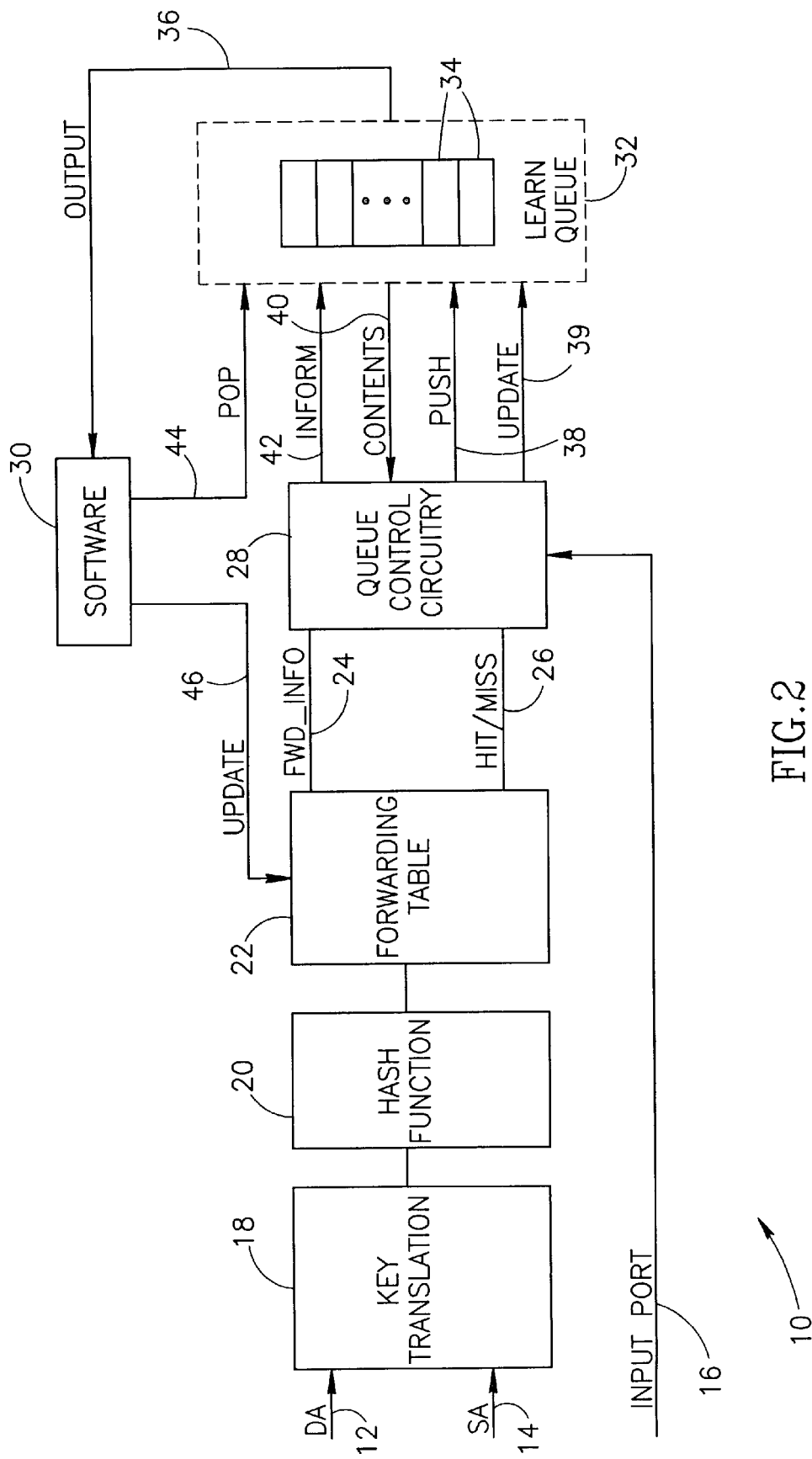
FIG. 2 is a block diagram illustrating the forwarding decision portion of an example network device incorporating a queue having a duplicate counter associated with each entry in accordance with the present invention.

A block diagram illustrating the forwarding decision portion of an example network device incorporating a queue having a duplicate counter associated with each entry in accordance with the present invention is shown in FIG. 2. The forwarding decision circuitry generally referenced 10, functions to make a forwarding decision using a lookup procedure. A forwarding table stores the forwarding decision information.

It is important to point out that the forwarding mechanism may utilize one or more input parameters in making a forwarding decision. Such parameters include but are not limited to Ethernet MAC DA, Ethernet MAC SA, IP DA, VLAN ID, LEC ID, Ethernet input port, ATM input port, ingress frame type, VPI/VCI, ELAN ID and MPOA tag. For clarity sake, however, the example presented herein utilizes only the MAC destination address (DA) 12 and the MAC source address (SA) 14.

The circuit 10 comprises a key translation circuit 18, hash function 20, forwarding table 22, queue control circuitry 28, a learning queue 32 and upper layer software 30. The processing of the forwarding decision is performed using a forwarding table lookup and is operative to generate forwarding information 24. The MAC DA and SA are input to a key translation circuit 18 (i.e. lookup select circuit) that generates a hash index for the hash function 20. The hash index is the input parameter for the hash table 20 that is operative to apply a hash function to the hash index. The hash algorithm utilizes one or more polynomials to perform polynomial division of the hash index by the hash function. The result of the polynomial division is the lookup index that is then applied to the forwarding table 22.

The forwarding table 22 is adapted to translate the lookup index to forwarding information 24. In addition, the forwarding table generates a hit/miss signal 26 indicating whether the lookup index was found or not. The forwarding table comprises a large memory storing a hash table that stores hashed lookup index values in a one way set associative organization. In the event the requested lookup index is found in the forwarding table 22 the hit/miss signal 26 is adapted to indicate a hit. In the event the requested lookup index is not found in the forwarding table 22 the hit/miss signal 26 is adapted to indicate a miss. Both the forwarding information 24 and the hit/miss indication signal 26 are input to the queue control circuitry 28.

Note that the network device described herein is adapted to implement both forwarding and learning functions. The forwarding and learning functions, however, are performed asynchronously with each other but use the same forwarding database. The forwarding function is performed using the MAC destination address as the key. In the case of a hit, the forwarding information 24 is used to determine the appropriate output ports to forward the frame to. In the case of a miss, the frame is flooded to all the output ports since no forwarding information exists for this specific frame.

The learning function, on the other hand, is performed using the MAC source address as the key to access the forwarding table. In the case of either (1) a miss on the forwarding database or (2) a hit with inconsistent information, the device performs the process in accordance with the present invention of attempting to push the relevant frame information onto the learn queue.

In accordance with the invention, the software is configured to asynchronously read frames from the learning queue 32 and process them so as to learn the associations between MAC source addresses and the ports on which they arrived. As a result of the learning process, the forwarding decision information in the forwarding table 22 is updated on a periodic basis by the software.

The learn queue 32, which preferably comprises a FIFO type queue, comprises a plurality of entries 34 wherein each entry comprises at least two fields as shown in FIG. 3. Each entry 50 is adapted to comprise a MAC source address field 52 and a duplicate counter 54. In the event of a miss, the queue control circuitry 28 is operative to write (i.e. push) the frame information 42 onto the queue 32 using a push command 38. The frame information may comprise any suitable information but preferably comprises the MAC source address and the corresponding port number on which the frame arrived.

The frame information pushed onto the queue is subsequently read from the queue by a software process 30 using a pop command 44. Note that the queue is read by the software process 30 in an asynchronous manner. Upon receiving a pop command, the queue is operative to output the entry at the head of the queue. The output 36 is read by the software 30 and a learning process performed on the frame information.

In accordance with the present invention, a miss on the forwarding table does not cause duplicate entries to be created in the queue. Before information is pushed onto the queue, the queue control circuitry is operative to search the contents of the queue for a match with an entry made previously. The contents are read by the queue control circuitry 28 from the learning queue 32 via contents data path 40.

If a match is not found, the frame information is pushed and the duplicate counter is initialized to one. If a match is found, the frame information is not written to the queue. Rather, the duplicate counter associated with the entry is incremented instead. In this manner, the operation of the queue is much more efficient since duplicate entries do not waste space in the queue.

A valid flag may optionally be associated with each entry to indicate whether the particular entry is valid. Accordingly, the queue control circuit 28 is adapted to only compare the frame information to be written with the entries whose valid flag is set.

Note also, that alternatively, the queue control circuit is adapted to perform the compare operation on all entries in the queue in the event of a miss on the forwarding table lookup and to push the frame information onto the queue in the event a matching entry is not found. In the event a matching entry is found, the queue contents are compared to the current frame information. If the queue contents are not consistent with the current frame information, the queue entry is updated via update command signal 39.

Optionally, the software may periodically read the contents of the duplicate counter in the valid entries. The duplicate counter values can be used to determine priority between entries, giving higher priority to entries whose duplicate counter values are higher, for example. In addition, the counter values may be used by the software to determine a watermark level that once crossed, triggers alternative processing for the corresponding entry.

Note that the interface between the software and learn queue comprises well known control signals used to read and write a queue such as write pointer, read pointer, full and empty indications, etc.

It is appreciated that one skilled in the electrical arts may construct the learning queue and associated queue control circuitry to provide the queue search capability. Further, the learning queue may be constructed differently depending on the number of desired entries. For example, discrete logic may be used to construct a queue having a relatively small size, e.g., 1 to 100 entries. A Content Addressable Memory (CAM) may be used to construct queues having a large number of entries.

It is also appreciated by one skilled in the art that if a queue having a relatively small number of entries is required, a linear search of the contents of the queue may be performed by the queue control circuitry. A queue comprising a larger number of entries may be implemented using a CAM. In the Abstract A queue having a duplicate entry counter associated with each entry whereby duplicate entries are not stored in the queue. Before data is placed in the queue, the queue is searched for an entry matching the data to be written. If a match is found, the duplicate counter associated with the entry is incremented. Further, if a match is found and the data stored therein is inconsistent with the current data, the contents of the queue are updated and the duplicate counter associated with the entry is reset to one. If a match is not found, the data is written to the queue and the duplicate counter associated with the entry is initialized to one.

A flow diagram illustrating the method of handling duplicate entries in said queue using a duplicate counter associated with each entry in accordance with the present invention is shown in FIG. 4. With reference also to FIG. 2, as described previously, the MAC source addresses of the frames that generate a miss on the forwarding table 22 are to be learned by the software 30 (step 60). The queue control circuitry is operative to check the contents of the queue for an entry with the same frame information (step 61). For example, a check is made of the MAC SA.

If a match is found (step 62), the existing queue entry is then checked to determine whether it is consistent with the current frame information (step 65). For example, the check comprises examining the input port number. If it is not consistent, the queue entry is updated with the current information (step 67) and the duplicate counter associated with the entry is reset to one (step 68).

If a match is found (step 62) and the existing queue entry is consistent with the current frame information (step 65), the duplicate counter is incremented (step 66).

If a match is not found (step 62), the new frame information, such as the MAC SA and port number, is written into the queue using a push operation (step 63). The duplicate counter associated with the entry is initialized to one and the valid flag is set to indicate the entry is valid (step 64).

Note that entries may be cleared by the software after processing, by clearing the valid bit. Note also that utilizing the queue of the present invention reduces the number of entries that are required since duplicate entries are not stored. Rather, the duplicate counter associated with the entry is incremented for each duplicate entry received.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A queue for eliminating and tracking duplicate entries, comprising:

a plurality of storage locations, each storage location adapted to store an entry;

a plurality of duplicate counters, each duplicate counter associated with a different storage location; and processing means operative to:

search, for each entry to be written to said queue, said plurality of storage locations for a matching entry previously written to said queue;

if a match is found, increment the duplicate counter associated with said matching entry;

if a match is not found, store said entry to be added in an unused storage location and initializing to one a duplicate counter associated with said entry to be added.

2. The queue according to claim 1, wherein said processing means is operative to update the contents of a matching entry if the contents of the matching entry are not consistent with the entry to be written to said queue.

3. The queue according to claim 1, wherein said queue comprises;

a first in first out type queue;

wherein an entry is added to said queue using a push operation; and wherein an entry is read from said queue using a pop operation.

4. The queue according to claim 1, wherein said processing means is implemented in hardware.

5. The queue according to claim 1, wherein said processing means is implemented in software.

6. The queue according to claim 1, further comprising a valid flag associated with each storage location in said queue, whereby only entries having their associated valid flag set are searched.

7. The queue according to claim 1, wherein said queue is implemented using Content Addressable Memory (CAM).

8. A learning queue for use by software means in a network device in learning the associations between Media Access Control (MAC) source addresses and corresponding ports in said device, comprising:

a plurality of storage locations, each storage location adapted to store an entry including, a MAC source address and corresponding port;

a plurality of duplicate counters, each duplicate counter associated with a different storage location; and a queue control circuit operative to:

search said plurality of storage locations for an entry having the same MAC source address as the MAC source address to be learned;

if a match is found, increment the duplicate counter associated with said matching entry;

if a match is not found, store said entry to be learned in an unused storage location and initializing to one a duplicate counter associated with said entry to be learned.

9. The learning queue according to claim 8, wherein said queue control circuit is operative to update the port information of a matching entry if the port information of the matching entry is not consistent with the port information associated with the MAC source address to be learned.

10. The learning queue according to claim 8, wherein said queue comprises;

a first in first out type queue;

wherein an entry is added to said queue using a push operation; and wherein an entry is read from said queue using a pop operation.

11. The learning queue according to claim 8, further comprising a valid flag associated with each storage location in said queue, whereby only entries having their associated valid flag set are searched.

12. The queue according to claim 8, wherein said queue is implemented using Content Addressable Memory (CAM).

13. The queue according to claim 1, further comprising means for utilizing said duplicate counters to determine one or more levels at which predetermined action is to be taken.

14. The learning queue according to claim 8, further comprising means for utilizing said duplicate counters to determine one or more levels at which predetermined action is to be taken.

15. The queue according to claim 1, further comprising means for reading said duplicate counters periodically and processing an entry if corresponding duplicate counter exceeds a predetermined threshold.

16. The learning queue according to claim 8, further comprising means for reading said duplicate counters periodically and processing an entry if corresponding duplicate counter exceeds a predetermined threshold.

17. The queue according to claim 1, further comprising means for determining priority among entries in said queue in accordance with the contents of said duplicate counters.

18. The learning queue according to claim 8, further comprising means for determining priority among entries in said learning queue in accordance with the contents of said duplicate counters.

* * * * *